United States Patent [19]

Gombos, Jr. et al.

[11] Patent Number: 5,386,545

[45] Date of Patent: Jan. 31, 1995

[54] TARGET MANAGEMENT METHOD FOR DATA BACKUP TO A SHARED TRANSFER STATION, MULTIPLE MEDIA ELEMENT DEVICE

[75] Inventors: Richard G. Gombos, Jr., Sanford; Thomas Pisello, DeBary, both of Fla.

[73] Assignee: Archive Corporation, Costa Mesa, Calif.

[21] Appl. No.: 951,055

[22] Filed: Sep. 25, 1992

[51] Int. Cl.$^6$ .............................................. G06F 13/00
[52] U.S. Cl. ..................... 395/575; 395/700; 364/236.2; 364/236.3; 364/248.1; 364/248.2; 364/285.1; 364/DIG. 1
[58] Field of Search ............... 360/71, 91, 92; 369/30, 369/34; 395/575, 700; 364/236.2, 236.3, 248.1, 248.2, 252, 268, 268.2, 285.1, 952.4, 952.5, 968.970

[56] References Cited

U.S. PATENT DOCUMENTS

| | | | |
|---|---|---|---|
| 4,981,409 | 1/9991 | Hirose et al. | 414/225 |
| 5,041,929 | 8/1991 | Fryberger et al. | 360/92 |
| 5,157,564 | 10/1992 | Theobald et al. | 360/92 |
| 5,182,687 | 9/1993 | Campbell et al. | 360/92 |
| 5,235,474 | 8/1993 | Searle | 360/71 |

OTHER PUBLICATIONS

David B. Miller, "Jukebox Heroes", DEC Professional, vol. 10, No. 5, May 1991, pp. 110–115.
Syndi Cummings, "Stop Losing Sleep Over Backups", LAN Times, vol. 9, No. 21, Nov. 9, 1992, pp. 100–102.
Ted Bowen, "ADS Touts 4mm DAT Subsystem for Small-Site Archival Storage Applications", Digital Review vol. 8 No. 35, Nov. 18, 1991, p. 23.
Thompson et al., "The Operation and Use of a 2 Terabyte Optical Archival Store", Ninth IEEE Symp. on Mass Storage Sys., Nov. 3, 1988, pp. 88–92.
Brian Platter, "Unattended 8mm Tape Backup and Storage for up to 200 GB", PTS New Product Announcements, Nov. 4, 1991, pp. 1–2.
Susan Solomonson, "Exabyte's Desktop Cartridge Handling Subsys. Allows Random Access to 50GB of Uncomp. Data", PTS New Product Announcements, Nov. 12, 1990, pp. 1–2.

*Primary Examiner*—Kevin A. Kriess
*Assistant Examiner*—Dennis M. Butler
*Attorney, Agent, or Firm*—Fliesler, Dubb, Meyer & Lovejoy

[57] ABSTRACT

A method is disclosed for specifying subsets and orders of processing of a set of target media elements utilized with a shared data transfer element in the backup of computer data to a data storage target device. Names assigned to selected target media configurations are used to designate logical groupings for storage and recall. In a described embodiment, a selected target configuration, chosen by name, is used to control the robotics of a tape cartridge backup system in coordination with the transfer of data to a tape drive read/write head, to automatically load tapes from user-designated slots of a tape magazine, in user-specified order, into the drive.

28 Claims, 2 Drawing Sheets

TARGET MANAGEMENT METHOD FOR DATA BACKUP TO A SHARED TRANSFER STATION, MULTIPLE MEDIA ELEMENT DEVICE

This invention relates to a method for the management of target destinations in the backup of computer data to a data storage device having a plurality of physically discrete, interchangeable data storage media elements which are successively loaded into a single, shared data transfer station.

BACKGROUND OF THE INVENTION

Data of a single or multiuser computer system is periodically backed up to enable restoration should the data become corrupted or destroyed due to hardware or software failure, or due to inadvertent deletion or change. Backup may be full or partial, and may be carried out at daily, weekly, monthly or other suitable time intervals.

There presently exist many backup utility programs which copy program and data files (collectively encompassed by the term "data"), usually in a compressed mode, from magnetic media hard disks or other data source locations, onto backup media elements such as magnetic tapes or disks sequentially loaded into proximity with a read/write head or similar structure of a tape drive, disk drive or other shared data transfer element. Typically, most backup programs allow backup of an entire disk, or selective backup of a subset of files chosen based upon a variety of file selection criteria, such as file names/extensions or dates of last access, modification, creation, or backup. Some such backup programs further allow the user (or the system administrator) to predefine the file tree and selection criteria so that periodic backups can be easily made without requiring the user to rethink backup strategy each time a backup is made. Recommended backup strategy usually involves making a disk-wide or "baseline" backup of all files at intervals, such as monthly; then making partial or "incremental" backups at shorter, intervening intervals, such as daily or weekly.

Conventional programs provide means for the user to select among available backup targets based upon the separate I/O port addresses of the connected data transfer elements (viz. tape or disk drives). Small backups may sometimes be completed on a single tape or disk media element loaded into the backup destination drive; but, more commonly, the usual backups will require the successive loading and unloading of a plurality of such tape or disk elements into the drive, with data transfer continuing until each media element is filled. The interchange of tapes or disks in the shared backup target drive elements may be effected manually. Larger backup systems, however, often employ a robotic arm or similar automatic media changer mechanism to enable the automatic, unattended interchange of target media elements. Though each tape or disk of a backup device having unattended media element interchange capability has its own predesignated physical location or slot, current implementations of backup media library management systems treat the device as a single target address (viz. address of the shared drive) for data transfer purposes, with the set of physically discrete data storage elements (viz. individual tapes or disks) being interchanged, albeit automatically, in a user-transparent way. Such implementation does not allow for random user access to individual media elements during backup, nor for selection by the user of the media element processing order. In conventional backup schemes, the entire library of media elements is viewed as one, continuous backup destination (one long media device). No single element in the media library is made individually addressable, nor can the elements be grouped and configured into user-designated logical arrangements.

Existing media management library systems, such as the Cheyenne ArcServe v4.0 used with an automatically loading tape drive unit, provide a sequential backup/random restore capability. The backup of data is performed by inserting a magazine containing a series of tape cartridges (set of media elements) into the automatic tape loader, which constitutes the media library device. The user selects the backup source, but cannot specify the backup destination to be a particular tape cartridge or user configurable subset of tape cartridges. The target device is seen as the tape drive itself, not the individual tape cartridges. The backup onto tape media is performed by starting with a first cartridge from the magazine, loading that cartridge for data transfer into the drive. When that tape is full, the first cartridge is unloaded and the second tape cartridge is loaded, and so on. As each tape is used to capacity, the next cartridge is automatically loaded, cascading the data transfer sequentially through the set of cartridges in the library. Such systems treat the set of media elements like a single large media element having a total capacity equal to the sum of the individual media element capacities.

Even though the hardware and communications protocol exist to tell the media changer which slot to go to for the next cartridge, and in what order, conventional backup utility programs make no provision for user-selectable random access to the individual cartridges. Moreover, no provision is made for a user to specify logical groupings of the tape cartridges as destination addresses for data transfer operations.

SUMMARY OF THE INVENTION

It is an object of the present invention to provide a method for the backup transfer of computer data to a data storage device having a tape drive or the like data transfer element shared in unattended mode by a plurality of cartridge-housed tapes or the like target media elements, wherein the user is enabled to randomly designate the identity of, and order in which, the media elements are to be targeted.

It is another object of the present invention to provide a method for the backup transfer of computer data to a data storage device, as described, wherein the user is enabled to designate logically addressable groupings and processing order configurations of subsets of available ones of the media elements for targeting.

In accordance with the invention, each media element (tape, disk, etc.) in a backup device media library is treated as an independently addressable target. Each media element itself is chosen and processed as if it were a data transfer element, like a tape drive, individually addressable for data transfer operations. Means is provided for grouping the separately addressable media element targets into target configurations that can be logically addressed as a group for data transfer operations. The system of the invention enables a user to independently address and select media elements as data transfer targets, and logically group the target items into target configurations. The logical groupings can then be named, stored and recalled for later use. Such independent addressability and treatment of media elements as separate configurable target devices enables full random access to the media elements in a unique, highly flexible and easily managed system.

In accordance with the invention, target configurations can be defined that consist of one or more user-selected media elements that are ordered by the user into a specific processing order. The system is implemented using software which responds to menu driven user selections to control the interchange of media elements by a media changer in accordance with SCSI (Small Computer System Interface) generated commands in response to the selections. The user develops a set of media element targets for the data transfer operation, selecting from a displayed list of available media elements, and presetting the processing order among the selected elements. The first media element specified by the user is then accessed based on its predesignated physical location source address by the media library device and placed into data transfer communication with the data transfer device. Next, backup is commenced, beginning with data transfer from the computer system onto the first media element, until that element is filled to capacity. The system then replaces the first media element in the data transfer device with the next user-selected media element, placing the first media element back into its original physical location source address. This process continues until all of the selected data is transferred, or until the user-specified media element processing list is exhausted.

In a preferred embodiment, described in greater detail below, the method of the invention is implemented as an augmentation of existing backup utility software loaded on a fileserver host of a network computer system, for transferring data from the computer host and/or server(s) to a peripheral stringing tape backup device having media changer means for the unattended loading/unloading of a succession of tape cartridges between respective different slots of a cartridge magazine and a common, shared tape drive. The invention can also be implemented in an application program running under the general auspices of conventional operating system software at a network node or stand-alone PC workstation. Traditional backup utilities would treat the backup device as a single target, addressing the tape drive as the lone data transfer element and treating the individual cartridge tapes as mere user-transparent extensions of one another. In contrast, the method of the invention generates basic SCSI specification commands to the media changer robotics, in cooperation with user specified designations of slots on the cartridge magazine, delaying traditional commands to transfer data to the targeted tape drive, until the next user-designated cartridge has been loaded in the right user-designated order into the drive.

By using the media library management method of the invention, a user is given a flexible means of obtaining random access to media during the data transfer process, as well as a means for managing the backup process through configurable backup target configurations. A user, for example, may create several backup target configurations designating different subsets of media elements for different user groups, different days of the week, or different backup types. These configurations can then be named, stored and recalled for use as logical targeting addresses in the future.

BRIEF DESCRIPTION OF THE DRAWINGS

Embodiments of the invention have been chosen for purposes of illustration and description; and are shown in the accompanying drawings, wherein.

Throughout the drawings, like elements are referred to by like numerals.

DESCRIPTION OF PREFERRED EMBODIMENTS

Figure 1:
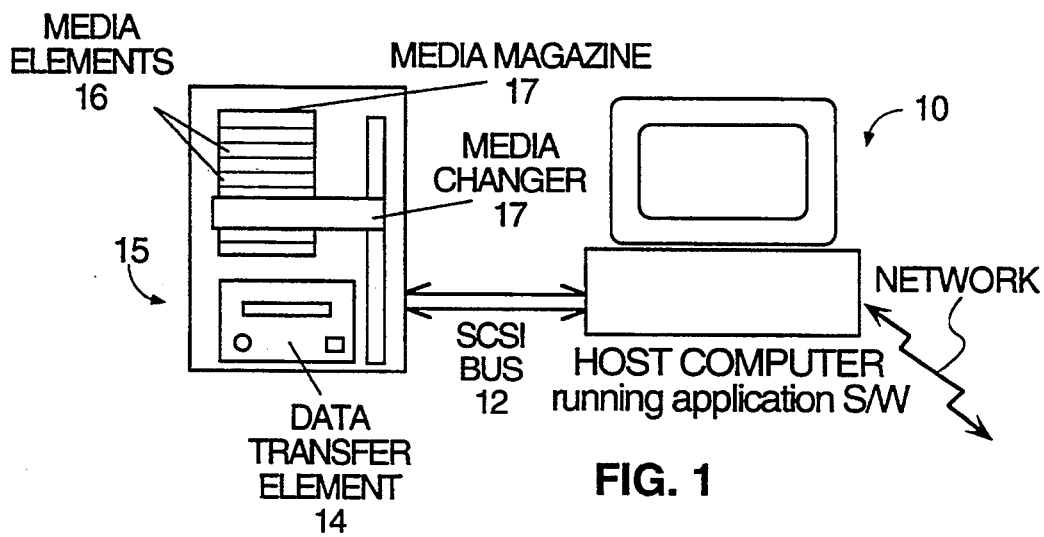
FIG. 1 is a schematic view of a computer system employing a shared transfer station, multiple media element data storage device.

FIG. 1 shows a host computer 10 connected in conventional manner in a local area or wide area network arrangement so as to perform a fileserver role to one or more remote user workstations (not shown). Computer 10 is connected via a standard SCSI (Small Computer System Interface) bus 12 to a shared data transfer element 14 of a backup media library device 15, which includes a plurality of physically discrete, interchangeable data storage media elements 16 respectively arranged in predesignated, separately identifiable physical locations within a media magazine 17. The device 15 further includes means, in the form of a media changer 18 responsive to commands received from computer 10 over the SCSI bus 12, for transporting individual ones of the elements 16 between their respective storage location source addresses in magazine 17 and positions loaded proximate a data read/write head within an element receiving portion of data transfer element 14.

Media library device 15 may take the form of any known data storage device suitable as a data transfer target destination for the periodic backup of data stored on the fileserver 10. Device 15 may, for example, be a model EXB-10i tape cartridge handling system, available commercially from EXABYTE Corporation, Boulder, Colo., or the like. The EXB-10i system has a magazine 17 with ten vertically spaced slots for respectively holding ten individual 8 mm tape cartridges, and includes a media changer 18 in the form of a robotic arm assembly that moves on vertical and horizontal lead screws to transport selected ones of the cartridges 16 between the magazine 17 and a cartridge tape drive 14.

The target management system of the invention can be implemented by way of backup utility software that cooperates to operate the tape cartridge changer in random mode, to load and unload data cartridges 16 under control of an SCSI controller in device 15, that implements commands delivered by the program in accordance with the ANSI SCSI-2 specification, according to target choices made by the user. If desired, several ones of the devices 15 can be connected in "daisy chained" series fashion to increase the number of tape cartridges 16 accessible for unattended manipulation.

Figure 2:
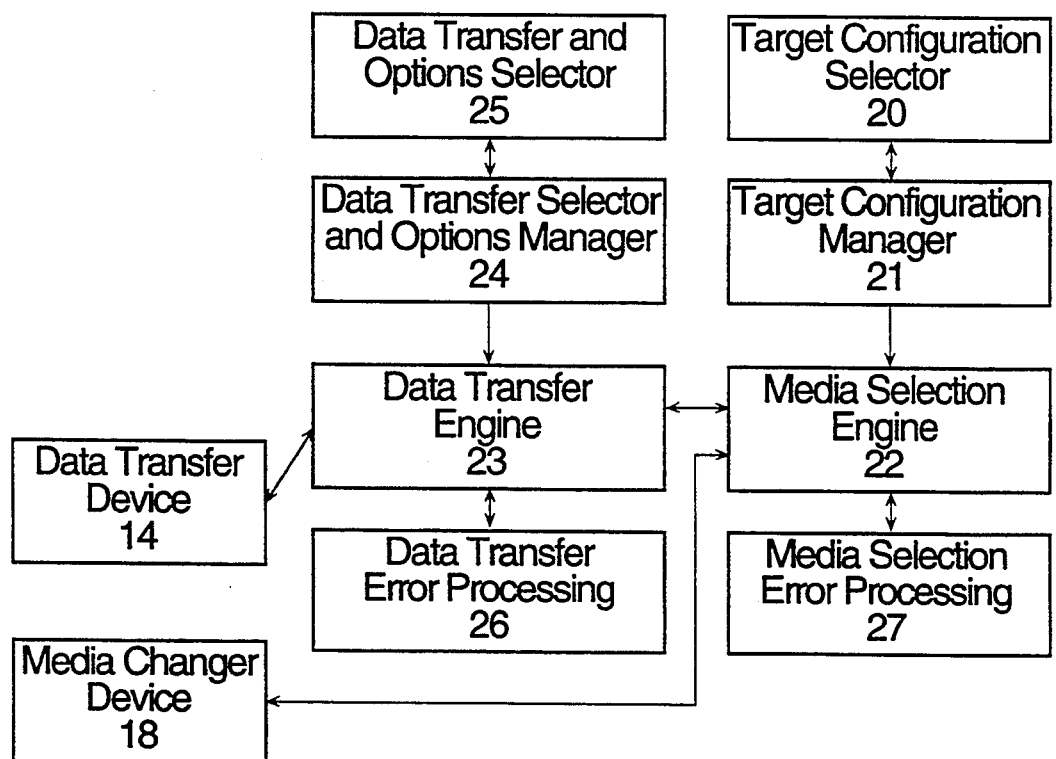
FIG. 2 is a block diagram of a target management system in accordance with the invention, usable for backup of data in the computer system of FIG. 1.

FIG. 2 shows a functional block diagram of an embodiment of the invention, employable with the computer system 10 of FIG. 1. The tape drive data transfer device 14 is accessed in accordance with known backup techniques, with the selection and processing order of tapes being specified by SCSI commands given to the robotic arm media changer device 18.

The Target Configuration Selector module 20 of the program (see FIG. 2) is responsible for displaying target configuration options and selections to the user, as well as for accepting user input regarding the creation, selection, editing and deletion of target configurations. The user input is interpreted and processed into a set of commands or data for the Target Configurations Manager module 21. User-provided inputs to the Target Configuration Selector module 20 include target configuration processing order; target configuration names; target configuration deletion requests; target configuration selection requests; and target configuration modification requests. Inputs to the Target Configuration Selector 20 from the Target Configurations Manager 21 include the list of available media elements; the list of already chosen target configurations; and the already previously selected target configuration processing orderings. Outputs from the Target Configuration Selector 20 to the user include selected target configuration options; "Create," "Delete," "Modify," "Select Default" function selections; selected target configuration names; and selected target configuration contents (i.e. processing orderings). Outputs from the Target Configurations Selector 20 to the Target Configurations Manager 21 include requests for listings of available media elements; target configuration processing orderings; target configuration names; target configuration selections; and deletion requests.

The Target Configuration Selector module 20 serves to display a list of target configuration options to the user. Processing proceeds based upon the options selected by the user. If the user selects the "Create" option, a list of available media elements (viz. filled slots in the magazine 17) is requested and obtained from the Target Configuration Manager module 21. The media element list is displayed for viewing by the user, and the user then selects a target configuration processing order and gives the selected target configuration a name. The selected name and processing order are then transferred to the Target Configurations Manager 21.

If the "Delete" option is chosen, a list of already existing target configuration names is requested from the Target Configurations Manager 21, and displayed to the user. The user then selects a target configuration name for deletion, and a deletion request is sent to the Target Configurations Manager 21.

If the user selects the "Modify" option, a list of existing target configurations is requested from the Target Configurations Manager 21 and displayed. When the name of the existing target configuration to be modified is chosen, the corresponding target configuration processing order is requested from the Target Configurations Manager 21 and displayed. The user can then edit the processing order, as desired, and save the edited version to the Target Configurations Manager 21 by executing a user "Save" request.

The "Select Default" option enables the user to pre-specify a "default" target configuration corresponding to a desired default subset and order of target media elements. Choosing the "Select Default" option requests the existing target configuration name list for display from the Target Configurations Manager 21. A desired default target configuration name may then be selected by the user, to be used as the processing list for determining the corresponding string of SCSI commands to be used for controlling the random access mode operation of the media changer 18, so that the desired default selection and order of transportation of cartridges 16 to the tape drive 14 can be achieved. The user-selected default target configuration name is transferred to the Target Configurations Manager 21 for use in future data transfer processes, unless manually overridden.

After selection of files for backup have been made by the user under the Data Transfer and Options Selector module 25, referred to below, the Target Configuration Selector 20 requests the user to select the desired target configuration for that particular backup. The options include the default, a manually-set one-time configuration, or one of the stored configurations. Favor is given to the default.

The Target Configurations Manager 21 is responsible for the storage and maintenance of the user selected target configuration lists. Inputs to the Target Configurations Manager 21 from the Target Configuration Selector 20 are the requests for listings of available media elements; target configuration processing orderings; target configuration names; user-initiated target configuration selections; and deletion requests. Inputs from the Media Selection Engine module 22 are the lists of available media elements; and requests for media processing lists. Outputs from the Target Configurations Manager 21 to the Media Selection Engine 22 are the media processing lists; and requests for lists of available media elements. Outputs to the Target Configuration Selector 20 include the lists of media elements; lists of target configurations; and target configuration processing orders.

The Target Configurations Manager 21 processes user requests from the Target Configuration Selector 20 and manages the media processing list library. The management of the library consists of managing target configuration creations, modifications, deletions, and selections for use. Management of the media processing lists occurs as follows: Upon receipt of a request for a list of available media elements from the Target Configuration Selector 20, the Target Configurations Manager 21 requests and obtains a list of available media elements from the Media Selection Engine 22. This list is obtained for the device 15 of FIG. 1 from the media changer 18 which keeps track of the slot or tape drive locations of all tapes 16. The list is provided to the Target Configuration Selector 20 as the list of available media elements from which the user can make target selections. After a target configuration selection has been made from the list, the Target Configurations Manager 21 will preserve that selected configuration, under a name designated by the user, as a media element selection and processing order for a future data transfer operation. Upon receipt of a subsequent request from the Media Selection Engine 22 for a media processing list under a chosen name, the Target Configurations Manager 21 sends the Media Selection Engine the list of media specified by the target configuration selection stored under that name, indicating which media elements are to be used and the order in which they are to be accessed for a particular data transfer operation.

For the system shown in FIG. 1, the displayed list of available media may, for example, take a form similar to that shown in Table 1, below:

| Order | Description | Address |
|---|---|---|
| | Backup Device No. 1 | 1.1 |

-continued

| Order | Description | Address |
|---|---|---|
|  | Backup Device No. 2 | 1.2 |
| 1 | Exabyte 10i-Slot 1 | 2.1 |
| 2 | Exabyte 10i-Slot 2 | 2.1 |
| 3 | Exabyte 10i-Slot 3 | 2.1 |
|  | ... |  |
| 4 | Exabyte 10i-Slot 10 | 2.1 |

The first two listed devices ("Backup Device No. 1" and "Backup Device No. 2") represent other peripheral devices connected to the network and available for data transfer through data transfer element addresses "1.1" and "1.2." These addresses may, for example, correspond to different device identifications "1" and "2" on a single SCSI bus, computer system I/O port identification "1". Each of the ten slots ("Slot 1" through "Slot 10") of the model EXB-10i device 15 is listed as a separate available target, though all ten slots are shown with the common data transfer element (tape drive 14) address "2.1" indicating, e.g., a single data transfer element identification "1" on a second SCSI bus, I/O port identification "2". The separate slots are, thus, given "soft" addresses for use internally in the program and not for use in directing the data transfer to different locations. All data will still be sent to the single address of the tape drive. The target management program will, however, use the different "soft" addresses of the respective slots to control which cartridge from which slot of the magazine 17 will be loaded in the tape drive 14 at any particular time to receive the data directed to the drive 14.

The order ("1," "2," "3," "4," etc.) appearing in the first column of Table 1 will be designated by the user, and will dictate the order in which the program directs the changer 18 to the respective cartridge slots. The user may, for example, create a target configuration for a Monday backup, designating the tape cartridges 16 in slots 1, 2, 3 and 10 of magazine 17 as the targets for that backup. This configuration can then be given the logical grouping name "MON." Other configurations can then be created designating, first, slots 4, 5, 6 and 10 and, then, slots 7, 8, 9 and 10 as targets given the logical grouping names "WED" and "FRI," respectively. Thus, a backup can be made on Monday to the tapes in slots 1, 2, 3 and 10, using the shorthand designation "MON" to call up the designated target configuration stored under that name; and, likewise, backups can be made on Wednesday and Friday to the tapes designated under the names "WED" and "FRI." The choice of the tape in slot 10 for all three backups may be made to accommodate the situation where normally only three tapes would be necessary but, occasionally, a fourth might be required. Making the overlapping choices avoids the need for wasting an extra slot for each day, or running the risk that the backup will terminate in an error or flow over onto an unintended tape if a fourth tape should be needed. User selections can also be conveniently made so that backups are effected onto different subsets of tapes for different departments (e.g. "FINANCE," "MARKETING," "ENGINEERING," etc.) or for different users (e.g. "HOST," "USER1," "USER2" etc.). This has the advantage of segregating backups based on individual requirements and also permits the system administrator to assign different levels of access to different media elements, providing a measure of security whereby the same backup device can serve the backup needs of different types of users. For example, each user may be able to backup and restore data relating to his or her own workstation, without thereby being given access to the data on the whole network.

Upon receipt of a deletion request from the Target Configuration Selector 20, the Target Configurations Manager 21 will delete the selected target configuration from the current target configuration list.

The Media Selection Engine 22 is responsible for managing and communicating media element requests to the media changer device 18. The media element requests are performed according to the media processing lists provided by the Target Configurations Manager 21. Inputs to the Media Selection Engine 22 from the Target Configuration Manager include the media processing lists, and requests for data transfer commencement; those from the Data Transfer Engine module 23 include requests for new media; and those from the media changer device 18 include media change status signals; and lists of available media elements. Outputs from the Media Selection Engine 22 include media change completion signals sent to the Data Transfer Engine 23; and media change requests sent to the media changer device 18.

Figure 3:
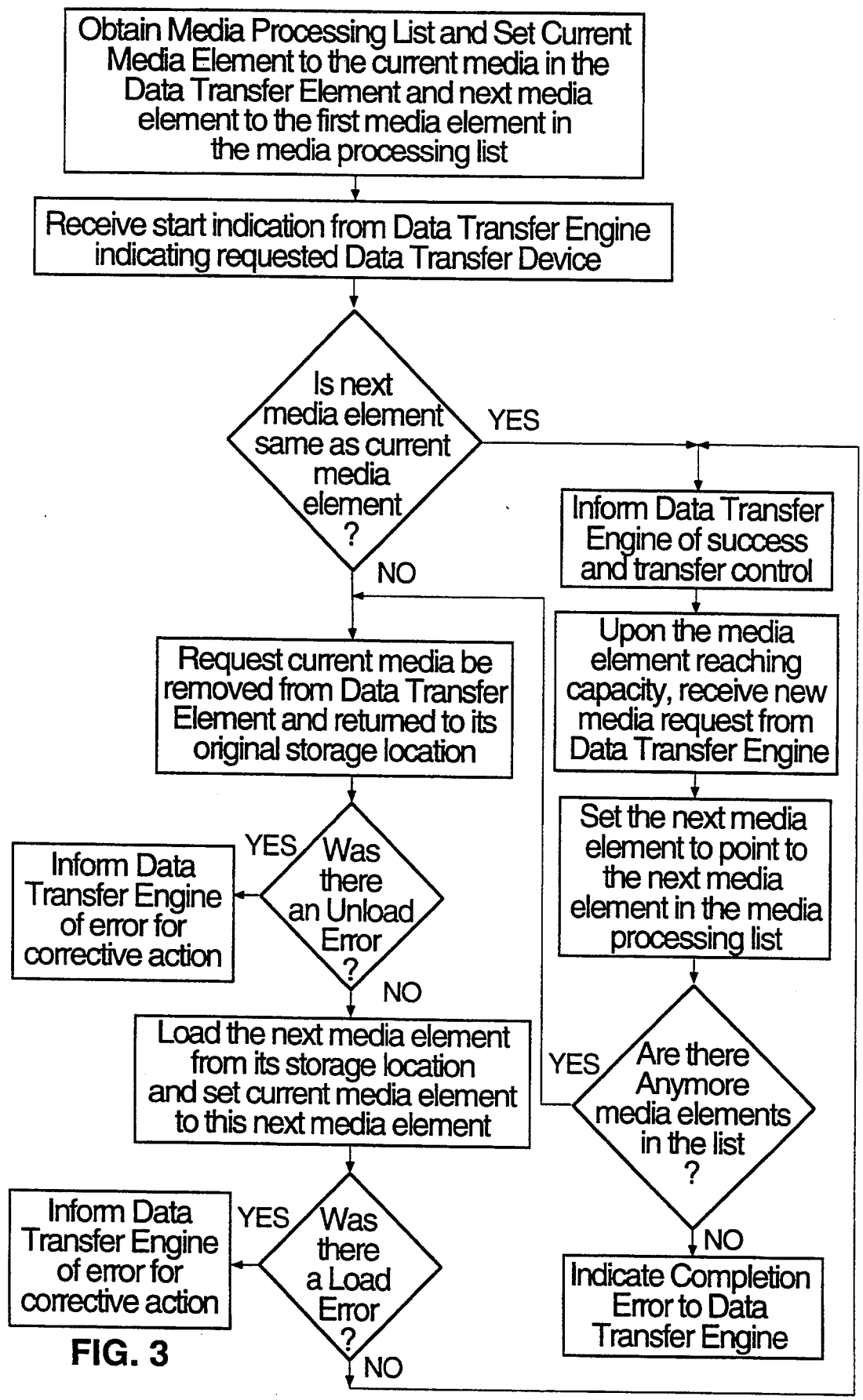
FIG. 3 is a flow diagram of the Media Selection Engine portion of the target management system of FIG. 2.

The processing operations of the Media Selection Engine 22 are shown in the flow diagram of FIG. 3. The Media Selection Engine 22 is responsible for the management and control of the media changer device 18. The Media Selection Engine 22 maintains a list of available media elements 16, which is developed during initialization of the media changer device 18. As part of the media element list, the Media Selection Engine 22 maintains a current status indication or "snapshot" of the present state of the media changer 18, including which media elements 16 are available for data transfer, the number of available data transfer devices 14, an identification of all media 16 presently in the data transfer devices 14, and other status information relating to the configuration of media changer device 18.

The Media Selection Engine 22 accepts a request to begin data transfer from the Data Transfer Engine 23. This request indicates that the data transfer device 14 is requesting that a data transfer be processed. The Media Selection Engine 22 obtains the media processing list from the Target Configurations Manager 21. If the first media element 16 identified in the obtained list does not match the first media element 16 located within the selected data transfer device 14, a media change request is issued to the media changer 18, requesting that the media element 16 currently located in the data transfer device 14 be removed by the media changer 18 and returned to its original storage location in the media magazine 17, and that a new element 16 corresponding to the indicated first media element address be transferred from the location in magazine 17 into the device 14. Upon completion of the media element transfer, the media changer device 18 communicates the media change status to the Media Selection Engine 22. Based on the status, the Media Selection Engine 22 updates the media element list to indicate that the desired media element 16 has been successfully placed into the requested data transfer element 14.

When the Media Selection Engine 22 receives the media change status, the completion is communicated to the Data Transfer Engine 23. If a load error occurs, the Data Transfer Engine 23 will cease the data transfer operation and communicate the failure to the user via the Data Transfer Selector and Options Manager module 24. Upon receipt of indication of successful completion of the media change operation, the Data Transfer Engine 23 will begin the data transfer to the first media element 16 appearing in the user-specified media processing list.

When the data transfer has proceeded to a point wherein the first media element 16 has reached its full data storage capacity, the Data Transfer Engine 23 is alerted by the data transfer device 14. The Data Transfer Engine 23 then communicates a request for new media to the Media Selection Engine 22. The Media Selection Engine 22 then examines the media processing list to identify the next media element 16 to be processed. The Media Selection Engine 22 then sends a media change request to the media changer device 18, instructing the changer 18 to move the first media element 16 from the device 14 to its original location in magazine 17, and to load the second media element 16 into the device 14 from the location in magazine 17 corresponding to the source address of the next media element in the user-specified media processing list. This processing repeats until the Data Transfer Engine 23 has completed all requested data transfer operations, or until the media processing list is exhausted.

The Data Transfer Engine 23 manages the interpretation, initiation, and synchronization of a user data transfer or utility operation request, as well as the processing of the data transfer operation and communications with the data transfer device. The Data Transfer and Options Selector 25 functions to present data transfer and utility options to the user and to obtain user input on the presented selections. These options can include items such as Backup, Restore, Erase, Catalog, Transfer (archive), and other data transfer or data management options. The Data Transfer Selector and Options Manager 24 is used to manage and store user selections regarding data transfer and utility option settings. Finally, the Data Transfer Error Processing module 26 and Media Selection Error Processing module 27 serve to process errors that occur during the data transfer and media selection processes, respectively.

The described target management system can be implemented by adding loader device support features to, for example, existing MaynStream TM NLM Software running on the host computer 10. The Media Selection Engine 22 generates basic SCSI motion commands in response to user selections and transmits them to the SCSI controller card in device 15 for controlling the media changer device 18 to, e.g., position the robotics arm (viz. grab base) in front of a specified slot location ("POSITION TO ELEMENT" command), or move a tape cartridge from one location (tape drive 14 or a slot in data cartridge holder 17) to another ("MOVE MEDIUM" command).

The system is configured with the host computer 10 running a systems application (as described above) to manage the transfer of data from the source storage device (e.g., fileserver hard drive or an attached network device) to the media library device 15. The control and data transfer between host 10 and media library device occurs via the SCSI bus according to the ANSI SCSI-2 specification. The host computer 10 is the initiator on the SCSI bus and the media library device 15 is the target. Standard SCSI-2 media changer commands are utilized by the host 10 to communicate media move commands to the media library robotics 18. Standard SCSI-2 sequential/random access device commands are utilized for data transfer operations to and from the drive(s) in the media library device.

Those skilled in the art to which the invention relates will appreciate that similar implementations to those described above may be achieved for not only other multiple tape media element devices, but also for devices having autoloading capabilities with respect to multiple media elements, such as magnetic and optical disks, as well. It will also be understood that other substitutions and modifications can be made to the described embodiments, without departing from the spirit and scope of the invention as described by the claims below.

What is claimed is:

1. A method of transferring digital data between a primary data storage system and one or more of a plurality of physically discrete, data storage media elements, where each of the data storage media elements is operatively and interchangeably engageable, one at a time, with a corresponding one of one or more shared media element drives of an automated element handling system, the element handling system being operatively coupled to the primary data storage system for effectuating data transfer therewith and the element handling system having one or more media element changers for automatically loading, and subsequently unloading, desired, physically available ones of the media elements into operative engagement with the corresponding one or more shared media element drives so that data transfer can take place between the loaded one or more shared media element drives and the primary data storage system, the method comprising the steps of:
    (a) identifying from among said plurality of data storage media element, a set of available media elements that are each either already loaded in the one or more shared media element drives or are each available for automatic loading into the one or more media element drives by said one or more media element changers;
    (b) displaying the identified set of available media elements to a user;
    (c) enabling the user to select one or more of the identified media elements from the displayed set;
    (d) defining all or a subset of the available media elements as a first selected set in accordance with the selection made by the user from the displayed set of available media elements;
    (e) recording the definition of the first selected set;
    (f) in response to the recorded definition of the selected set, controlling the one or more media element changers to load, where necessary, one or more of the media elements of the corresponding selected set into operative engagement with the one or more shared media element drives; and
    (g) in coordination with the loading by the one or more media element changers, transferring data between the primary data storage system and the one or more media elements of the selected set that are loaded into the one or more shared media element drives.

2. The method of claim 1, further comprising, for the case where the user selects at least two media elements from the displayed set of available media elements, the steps of:
    (h) enabling the user to indicate a sequence for the two or more of the identified media elements selected from the displayed set;

(i) defining and recording a first order of processing for the first selected set of available media elements corresponding to the sequence indicated by the user; and wherein the controlling step (f) and the coordinated data transfer step (g) further comprise, in response to the defined and recorded order of processing, causing the one or more media changers to load the media elements, as necessary, and causing the one or more shared media element drives to operate such that data is sequentially transferred between the primary data storage system and one or more media elements of the corresponding selected set in accordance with the correspondingly defined and recorded order of processing.

3. The method of claim 1, further comprising the steps of:

(h) after recording the definition of the first selected set;

(h.1) enabling the user for a second time to select one or more of the identified media elements from the displayed set;

(h.2) defining all or a subset of the available media elements as a second selected set in accordance with the second selection made by the user from the displayed set of available media elements;

(h.3) recording the definition of the second selected set; and (i) after said recordings (e, h.3) of the definitions of the first and second selected sets;

(i.1) recalling a desired one of the recorded definitions of the first and second selected sets; and (i.2) using the recalled definition as the responded-to definition in said load control and data transfer steps, (f) and (g), such that said data transfer takes place between the primary data storage system and one or more media elements in the set of the recalled definition.

4. The method of claim 3, further comprising the steps of;

(j) assigning a first name to the recorded definition of the first selected set;

(k) assigning a second name to the recorded definition of the second selected set; and (l) using the assigned first or second name in said recalling step (i.1) to recall the desired one of the recorded definitions of the first and second selected sets 5. The method of claim 3, wherein at least one media element is common to the definition of both the first and second selected sets.

6. The method of claim 3, further comprising, for the case where the user selects at least media elements from the displayed set of available media elements for each of the first and second selections, the steps of:

(j) enabling the user to indicate respective first and second sequences for the two or more identified media elements selected from the displayed set in the respective first and second selections;

(k) defining and recording respective first and second orders of processing for the first and second selected sets of the available media elements corresponding to the first and second sequences indicated by the user;

(l) recalling a desired one of the first and second orders of processing; and (m) wherein the controlling step (f) and the coordinated data transfer step (g) further comprise, in response to the recalled one of the defined and recorded first and second orders of processing, causing the one or more media changers to load the media elements, where necessary, and causing the one or more shared media element drives to operate such that data is sequentially transferred between the primary data storage system and one or more media elements of the corresponding selected set in accordance with the correspondingly recalled order of processing.

7. A data transfer method according to claim 1 wherein said automated element handling system has at least two media changers.

8. A data transfer method according to claim 1 wherein said automated element handling system has at least two shared media element drives.

9. A data transfer method according to claim 8 wherein said at least two shared media element drives are operatively coupled to one another by a SCSI bus.

10. A data transfer method according to claim 9 wherein said automated element handling system has at least two media changers operatively coupled to and controlled over said SCSI bus.

11. A data transfer method according to claim 1 wherein said automated element handling system is operatively coupled to the primary data storage system by a SCSI bus and the one or more media changers are controlled over said SCSI bus.

12. A method for transferring digital data between a primary data storage system and one or more of a plurality of physically discrete, data storage media elements, where each of the data storage media elements is operatively and interchangeably engageable, one at a time, with a corresponding one of one or more shared media element drives of an automated element handling system, the element handling system being operatively coupled to the primary system for effectuating data transfer therewith and the element handling system having one or more media element changers for automatically loading, and subsequently unloadings desired, physically available ones of the media elements into operative engagement with the corresponding one or more shared media element drives so that data transfer can take place between the loaded one or more shared media element drives and the primary data storage system, the method comprising the steps of:

(a) identifying from among said plurality of data media elements, a first set of available media elements that are each either already loaded in the one or more shared media element drives or are each available for automatic loading into the one or more media element drives said one or more media element changers, said identified first set of media elements being further limited to those that are logically available in accordance with predefined logical availability criteria, to a corresponding first user, or to a corresponding first user group or to a corresponding first processing task;

(b) displaying the identified set of available media elements to an authorized user;

(c) enabling the authorized user to select at least two of the identified media elements from the displayed set;

(d) defining all or a subset of the at least two available media elements as a first selected set accordance with the selection made by the authorized user from the displayed set of available media elements;

(e) recording the definition of the first selected set;

(f) enabling the authorized user to indicate a corresponding sequence for the at least two identified media elements selected from the displayed set;

(g) defining and recording a first order of processing media elements corresponding to the for the first selected set of the at least two available media elements corresponding to the sequence indicated by the authorized user; said recorded first order of processing designating a corresponding first sequence of access to be followed for the first selected set of media elements during a corresponding data transfer;

(h) recalling the recorded definition of the selected set and the corresponding recorded order of processing;

(i) in response to the recalled definition of the selected set and the recalled, corresponding order of processing, controlling the one or more media element changers to load, where necessary, one or more of the media elements of the corresponding selected set into operative engagement with the one or more shared media element drives such that data transfer can take place between the loaded one or more shared media element drives and the primary data storage system in accordance with the recalled recorded definition of the selected set and the corresponding recorded order of processing; and (k) in coordination with the loading by the one or more media element changers, and in accordance with the recalled recorded definition of the selected set and the corresponding recorded order of processing, transferring data between the primary data storage system and the one or more media elements of the selected set that are loaded into the one or more shared media element drives.

13. A method for backing-up computer data by transferring the data from a primary storage system to a plurality of data storage cartridges available within an automatic cartridge access system having a robotic mechanism for automatically loading and unloading the available cartridges between predesignated slots of a cartridge magazine and a shared cartridge drive, the method comprising the steps of:

(a) identifying the available cartridges and a corresponding set of slots of the cartridge magazine;

(b) displaying a list representing the identified, available cartridges to a user;

(c) enabling the user to select one or more of identified cartridges from the displayed list and to indicate a desired first sequence of access for the selected cartridge;

(d) defining all or a subset of the available cartridges as a first selected set in accordance with the selection made by the user from the displayed list of available cartridges;

(e) defining a first order of processing for the first selected set of available cartridges corresponding to the sequence of access indicated by the user;

(f) recording the definition of the first selected set and the corresponding first order of processing;

(g) recalling the recorded definition of the selected set and the corresponding order of processing;

(h) in response to, and in accordance with, the recalled definition of the selected set and the corresponding order of processing, loading a first one of the selected set of storage cartridges into the shared cartridge drive;

(i) backing up a predefined block of data from the primary storage system to the first loaded cartridge until a predefined maximum storage capacity of the first loaded cartridge is reached or an end of the block of data is reached;

(j) if the predefined block of data is not fully backed up by the above backup step (i) and there are additional cartridges in the recalled definition of the selected set, loading a next cartridge of the selected set of storage cartridges into the shared cartridge drive in response to, and in accordance with, the recalled definition of the selected set and the corresponding order of processing; and (k) if the predefined block of data is not full backed up by the above backup steps (i) and (j), repeating above backup step (j) until backup is completed or until there are no more cartridges in the recalled selected set, whichever occurs first.

14. The method as in claim 13, further comprising the steps of:

assigning a first name to the definition of the first selected set and the corresponding first order of processing;

using the assigned first name in said step (f) of recording the definition of the first selected set and the corresponding first order of processing; and using the assigned first name in said step (g) of recalling the recorded definition of the selected set and the corresponding order of processing.

15. A method as in claim 8, further comprising the steps of:

after said step (f) of recording the definition of the first selected set and the corresponding first order of processing, (f.1) enabling the user for a second time to select one or more of the identified cartridges from the displayed list and to indicate a desired second sequence of access for the selected cartridges;

(f.2) defining all or a subset of the listed cartridges as a second selected set in accordance with the second selection made by the user from the displayed set of available media elements;

(f.3) defining a second order of processing for the second selected set of available cartridges corresponding to the second sequence of access indicated by the user;

(f.4) storing the second selected set and the second order of processing under a second name; and during said step (g), recalling one of the first or second selected sets and processing orders using the corresponding first or second name.

16. A data transfer system comprising:

(a) primary data storage means for storing digital data;

(b) automated element handling means, operatively coupled to the primary data storage means for effectuating data transfer therewith, the element handling means having one or more shared media element drives into each of which is loadable, one at a time, a plurality of physically discrete, interchangeable, data storage media elements, and the element handling means further having one or more media element changers, operatively engageable with corresponding ones of the one or more shared media element drives and with available ones of the data storage media elements, for loading respective ones of the available storage media elements into operative engagement with the one or more shared media element drives, and for unloading loaded ones of the storage media elements from the corresponding one or more shared media element drives;

(c) media element selection means, operatively coupled to the one or more automated element handling means, for controlling the load and unload operations of the corresponding one or more media element changers, said media element selection means including snapshot means for maintaining a current status indication of the number of media element drives available for effectuating data transfer, and of the number of storage media elements available for data transfer, including all storage media elements currently loaded in the media element drives; and (d) configuration selection means, operatively coupled to the media element selection means, for:

(d.1) displaying to a user, a representation of a set of pre-identified media elements that are each at least physically available by virtue of being either already loaded into the one or more shared media element drives or being available for automatic loading into the one or more media element drives by said one or more media element changers, said pre-identification of the physically available media elements being derived from the current status indication maintained by the media element selection means, (d.2) enabling the user to select one or more of the pre-identified media elements from the displayed set, (d.3) defining all or a subset of the pre-identified media elements as a first user-selected set in accordance with the selection made by the user from the displayed set of pre-identified media elements, and (d.4) in response to the definition of the user-selected set, outputting control signals to the one or more automated element handling means, to control the one or more media element changers so as to load, where necessary, one or more of the media elements of the corresponding user-selected set into operative engagement with the one or more shared media element drives such that automated data transfer can take place between the loaded one or more of the media elements of the corresponding user-selected set and the primary data storage means.

17. A data transfer system according to claim 16 further comprising:

(e) configuration management means, operatively coupled to the configuration selection means and to the media element selection means, for recording the definition of the user-selected set and for subsequently recalling the user-selected set for output as said control signals to the one or more automated element handling means.

18. A data transfer system according to claim 17 wherein the configuration selection means includes means for:

(d.5) in the case where the user selects at least two media elements from the displayed set of pre-identified available media elements, enabling the user to indicate a sequence for the two or more of the pre-identified media elements selected from the displayed set;

(d.6) defining the sequence indicated by the user as a first order of processing for the corresponding user-selected set of pre-identified available media elements; and (d.7) including in said control signals output to the one or more automated element handling means, the user-indicated order of processing such that in response to the control signals, the one or more automated element handling means load the media elements of the user-selected set, as necessary, and cause the one or more shared media element drives to operate such that data is sequentially transferred between the primary data storage system and one or more media elements of the corresponding user-selected set in accordance with the correspondingly defined order of processing.

19. A data transfer system according to claim 18 wherein said configuration management means includes (e.1) means for recording the definition of the user-indicated order of processing and for subsequently recalling the user-indicated order of processing for output as part of said control signals to the one or more automated element handling means.

20. A data transfer system according to claim 16 wherein said automated element handling means has at least two media changers.

21. A data transfer system according to claim 16 wherein said automated element handling means has at least two shared media element drives.

22. A data transfer system according to claim 21 wherein said at least two shared media element drives are operatively coupled to one another by a SCSI bus.

23. A data transfer system according to claim 22 wherein said automated element handling means has at least two media changers operatively coupled to and controlled over said SCSI bus.

24. A data transfer system according to claim 16 wherein said automated element handling means is operatively coupled to the primary data storage means by a SCSI bus and the one or more media element changers are controlled over said SCSI bus.

25. A data transfer system according to claim 16 wherein said primary data storage means is part of a file server that is operatively coupled to a data exchange network.

26. A data transfer system according to claim 16 wherein said configuration selection means includes means for pre-identifying media elements as not only being physically available but also as being logically available by virtue of being pre-assigned exclusively to a corresponding user or to a corresponding user group or to a corresponding automated task.

27. A data transfer system according to claim 26 wherein said configuration selection means includes means for displaying to a user, a representation of a set of pre-identified media elements that are each logically available to the user by virtue of the user belonging to a corresponding user group.

28. A data transfer system according to claim 16 wherein said configuration selection means includes means for displaying to a user, a representation of a set of pre-identified media elements that are each logically available to the user by virtue of the media elements having empty storage space into which data may be stored.

* * * * *